(12) United States Patent
Uehara et al.

(10) Patent No.: US 9,166,632 B1
(45) Date of Patent: *Oct. 20, 2015

(54) MIXER CIRCUITS WITH PROGRAMMABLE CHARACTERISTICS

(71) Applicant: Marvell International LTD., Hamilton (BM)

(72) Inventors: Gregory Uehara, Kaneohe, HI (US); Brian Brunn, Bee Cave, TX (US); Xiaohua Fan, Austin, TX (US); Sehat Sutardja, Los Altos Hills, CA (US)

(73) Assignee: Marvell International LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,538

(22) Filed: Jun. 10, 2014

Related U.S. Application Data (63) Continuation of application No. 13/850,033, filed on Mar. 25, 2013, now Pat. No. 8,750,437, which is a continuation of application No. 12/372,293, filed on Feb. 17, 2009, now Pat. No. 8,406,358.

(60) Provisional application No. 61/028,695, filed on Feb. 14, 2008.

(51) Int. Cl.
| | |
|---|---|
| *H04L 1/00* | (2006.01) |
| *H04B 1/00* | (2006.01) |
| *H04B 1/18* | (2006.01) |
| *H04B 1/30* | (2006.01) |

(52) U.S. Cl.
CPC ............... *H04B 1/0028* (2013.01); *H04B 1/18* (2013.01); *H04B 1/30* (2013.01)

(58) Field of Classification Search
USPC .......................................... 375/340; 455/313
See application file for complete search history.

(56) References Cited

U.S. PATENT DOCUMENTS

| | | | |
|---|---|---|---|
| 5,614,904 A | 3/1997 | Dent | |
| 6,121,828 A | 9/2000 | Sasaki | |
| 6,313,680 B1 | 11/2001 | Havens et al. | |
| 6,385,439 B1 | 5/2002 | Hellberg | |
| 6,856,655 B1 | 2/2005 | Garcia | |
| 6,895,190 B1 | 5/2005 | Neumann et al. | |
| 7,532,873 B2 | 5/2009 | Mohindra | |
| 7,715,802 B2 | 5/2010 | Yoshida et al. | |
| 2004/0228417 A1 | 11/2004 | Kennedy et al. | |
| 2006/0286956 A1 | 12/2006 | Munker et al. | |
| 2008/0284487 A1 | 11/2008 | Pullela et al. | |
| 2009/0191833 A1 | 7/2009 | Kaczman et al. | |
| 2009/0202022 A1 | 8/2009 | Kaczman et al. | |
| 2010/0267354 A1 | 10/2010 | Mirzaei et al. | |
| 2011/0275340 A1* | 11/2011 | Kawabe et al. | 455/313 |
| 2013/0142287 A1* | 6/2013 | Kravets | 375/340 |
| 2013/0171970 A1* | 7/2013 | Naiki et al. | 455/411 |
| 2015/0017939 A1* | 1/2015 | Waters et al. | 455/226.1 |

* cited by examiner

*Primary Examiner* — Eva Puente (57) ABSTRACT

A receiver including a mixer, a clock generator, a plurality of capacitances, a plurality of resistances, and a controller. The mixer includes a plurality of switches. The clock generator is configured to generate clock signals to drive the plurality of switches of the mixer. The plurality of capacitances couples the clock signals to respective inputs of the plurality of switches. The plurality of resistances couples to the respective inputs of the plurality of switches. The controller is configured to output a first signal to the plurality of resistances. The first signal determines one or more attributes of the clock signals. One or more switching characteristics of the plurality of switches of the mixer are based on the one or more attributes of the clock signals.

20 Claims, 12 Drawing Sheets

PRIOR ART

Fig.3

PRIOR ART

Fig. 4

PRIOR ART

MIXER CIRCUITS WITH PROGRAMMABLE CHARACTERISTICS

CROSS-REFERENCE TO RELATED APPLICATIONS

This is a continuation of U.S. patent application Ser. No. 13/850,033 (now U.S. Pat. No. 8,750,437), filed on Mar. 25, 2013, which is a continuation of U.S. patent application Ser. No. 12/372,293 (now U.S. Pat. No. 8,406,358), filed on Feb. 17, 2009, which claims the benefit of U.S. Provisional Patent Application No. 61/028,695, filed on Feb. 14, 2008. The entire disclosures of the above referenced applications are incorporated herein by reference.

TECHNICAL FIELD

The disclosed concepts relate generally to radio-frequency (RF) apparatus and, more particularly, to radio-frequency apparatus with programmable performance, and associated methods.

BACKGROUND

RF communication apparatus have found widespread use in both consumer and commercial applications. For example, cellular or mobile telephones, widely used across the globe, include RF circuitry. The RF circuitry is rather sophisticated, as it often meets the specifications for more than one communication protocol or standard, for example, 2G and 3G. As a result, the RF circuitry often has to meet competing specifications and performance criteria.

SUMMARY

The disclosed concepts relate generally to RF apparatus and related methods, such as RF communication apparatus with programmable performance, for example, programmable linearity, gain and/or noise figure. In one exemplary embodiment, a radio frequency (RF) apparatus has a receiver. The receiver includes a mixer, a clock generator, and a common mode controller. The clock generator couples to the mixer. The common mode controller couples to the outputs of the mixer and provides a common-mode input to baseband amplifiers. The mixer includes a number of switches. These switches are located in a well that is biased accordingly. The clock signals generated by the clock generator are AC coupled to the mixer and biased by a bias voltage which may be varied accordingly. The mixer, the clock generator and the common mode controller are operated collectively to program linearity and a gain of the receiver.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to RF apparatus and related methods. More specifically, the disclosed concepts relate to RF communication apparatus with programmable performance, and associated methods. For example, as described in detail below, one may implement communication apparatus with programmable linearity and gain and/or make possible the trading off of performance measures such as linearity (e.g., second order input intercept point (IIP2)), gain, and noise figure (NF).

Some communication protocols or standards (e.g., cellular 3G) specify relatively high linearity. To meet those specifications, one may use calibration-intensive analog approaches. Doing so, however, would entail repeated calibration, and would have other drawbacks. The disclosed concepts overcome the disadvantages of conventional approaches.

In addition, the disclosed concepts provide low pass filtering of the received signals. The filtering removes (or substantially removes or attenuates) transmitter leakage (described below) before amplification and baseband processing.

Figure 1:
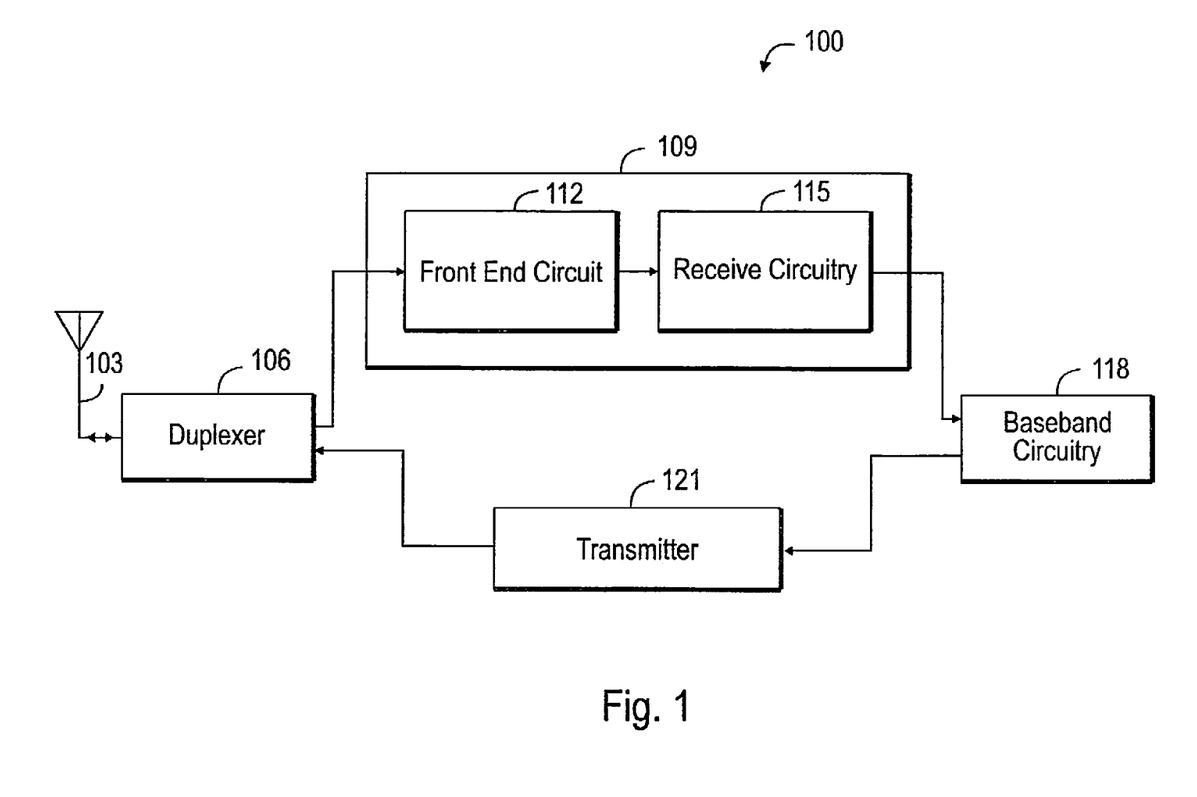
FIG. 1 illustrates a simplified block diagram of an RF transceiver according to an exemplary embodiment.

Some embodiments according to the disclosed concepts relate to front end circuitry in RF receivers or transceivers. FIG. 1 illustrates a simplified block diagram of an RF transceiver 100 according to an exemplary embodiment. Transceiver 100 includes antenna 103, duplexer 106, receiver 109, transmitter 121, and baseband circuitry 118.

Antenna 103 allows the reception or transmission of RF signal by transceiver 100. Duplexer 106 allows receiver 109 to couple to antenna 103 to receive RF signals and/or transmitter 121 to couple to antenna 103 to transmit RF signals.

Note that, depending on the communication standard or protocol used, in some embodiments, transceiver 100 may transmit and receive signals at the same time. For example, some 3G cellular standards prescribe simultaneous reception and transmission of RF signals.

In such a scenario, some of the output signals of transmitter 121 might leak through duplexer 106 to receiver 109. This phenomenon, known as transmitter leakage, tends to adversely affect the performance of receiver 109 in conventional RF apparatus. As described in detail below, the disclosed concepts provide filtering of the transmitter leakage and, relax requirements of and improve the performance of receiver 109.

During the transmit mode, baseband circuitry 118 provides transmit signals to transmitter 121. Transmitter 121 modulates an RF signal with the transmit signals, and provides the resulting modulated RF signal to duplexer 106 for transmission by antenna 103.

Conversely, during the receive mode, antenna 103 provides RF signals to receiver 109 via duplexer 106. Receiver 109 includes front end circuitry 112 and receive circuitry 115.

Front end circuitry 112, described below in detail, processes the received RF signals by amplifying the signals and mixing them down, using one or more RF local oscillator signals.

Receive circuitry 115 may include further signal processing blocks and circuitry. Examples include filtering, equalization, and analog-to-digital conversion. Receive circuitry 115 processes the mixed RF signals from front end circuitry 112, and provides the processed signals to baseband circuitry 118.

Baseband circuitry 118 may process the signals received from receive circuitry 115 further. Examples of such processing include decoding, demodulation, filtering, digital signal processing (DSP), etc., as persons of ordinary skill in the art who have the benefit of the description of the disclosed concepts understand.

Front end circuitry 112 according to the disclosed concepts provide advantages over conventional approaches. More specifically, front end circuitry 112 provides programmable linearity (e.g., IIP2), gain (out-of-band attenuation), noise, etc.

Figure 2:
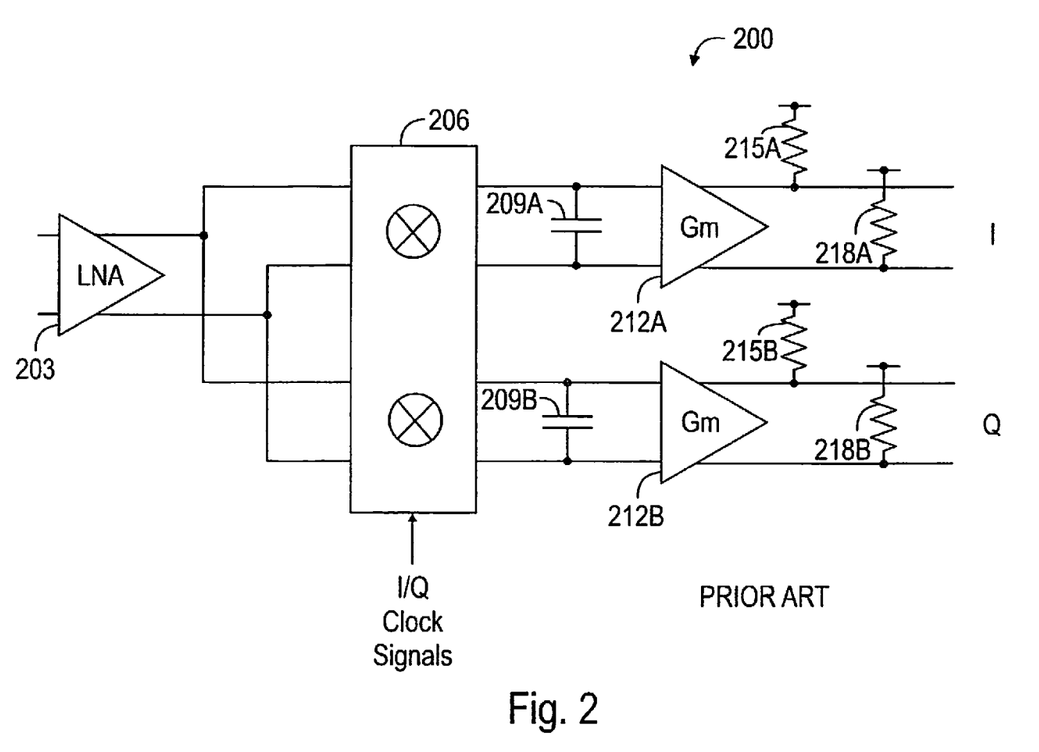
FIGS. 2-4 depict conventional receiver front end circuitry.
Figure 3:
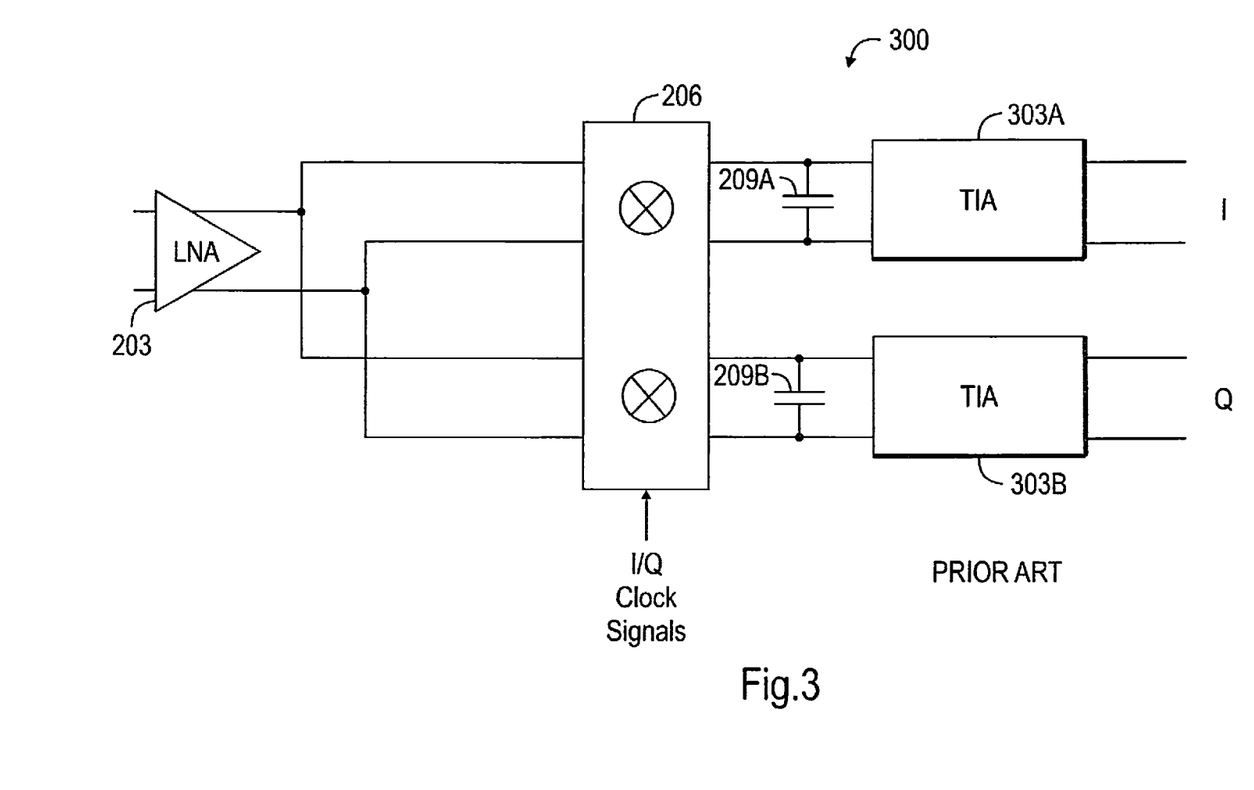
Figure 4:
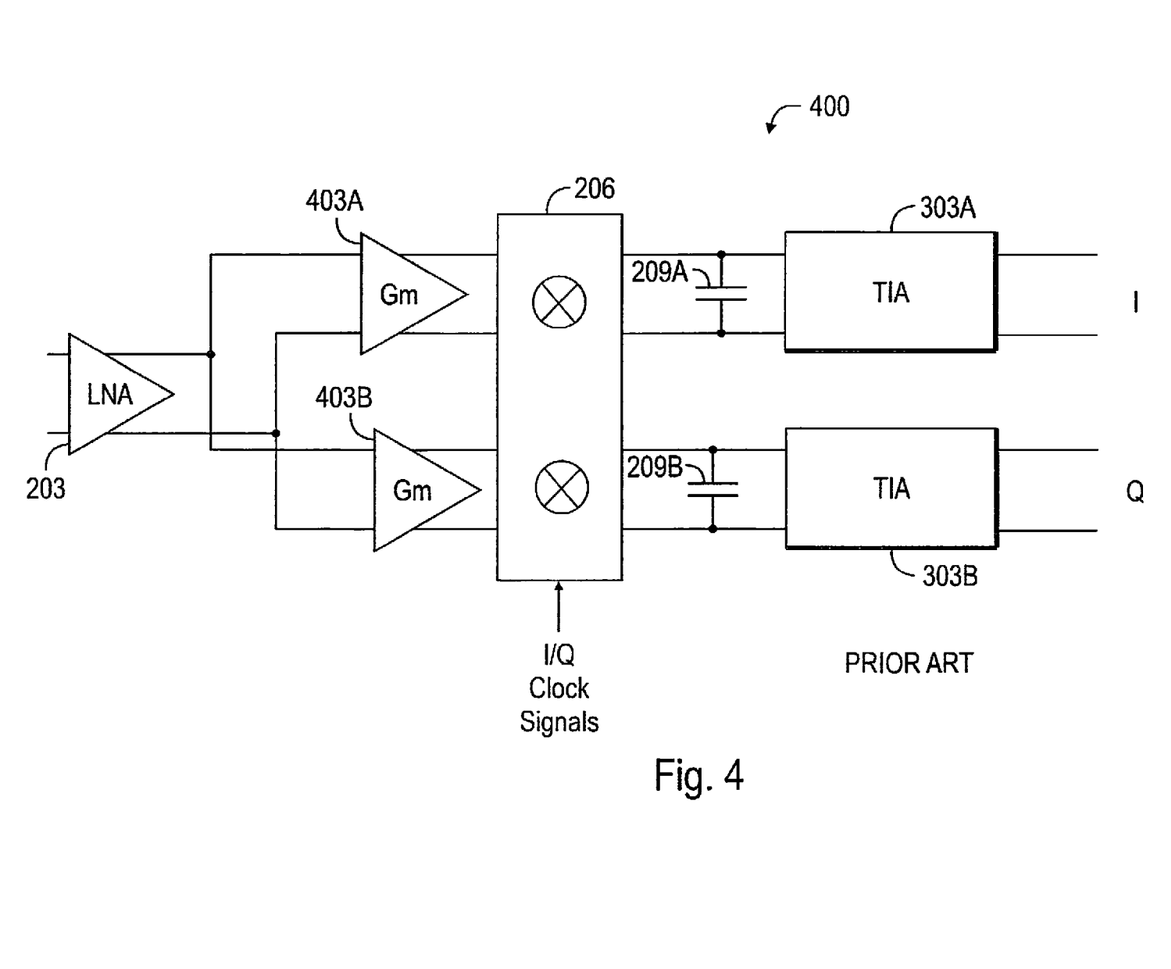

FIGS. 2-4 depict conventional receiver front end circuitry. FIG. 2 shows a conventional front end circuitry 200 that includes low noise amplifier (LNA) 203, mixer 206, capacitors 209A-209B, transconductors 212A-212B, and resistors 215A-215B and 218A-218B.

LNA 203 receives and amplifies RF signals, and provides the amplified signals to mixer 206. Mixer 206 mixes the amplified signals with in-phase (I) and quadrature (Q) clock signals, and provides mixed I and Q signals to transconductors 212A-212B.

Resistors 215A-215B and 218A-218B provide biasing for transconductors 212A-212B, respectively. Transconductors 212A-212B typically have high input impedances.

Capacitors 209A-209B filter the mixed I and Q signals. Typically, capacitors 209A-209B have relatively small capacitance values.

FIG. 3 shows another conventional front end circuitry 300 that includes low noise amplifier (LNA) 203, mixer 206, capacitors 209A-209B, and trans-impedance amplifiers (TIAs) 303A-303B.

LNA 203 and mixer 206 function as described above in connection with FIG. 2. Mixer 206 provides mixed I and Q signals to TIA 303A and TIA 303B, respectively.

Capacitors 209A-209B filter the mixed I and Q signals. Typically, capacitors 209A-209B have relatively large capacitance values. The large capacitance of capacitors 209A-209B attenuates the sum term (also known as the "2× term") from the output I and Q signals of mixer 206.

FIG. 4 shows another conventional front end circuitry 400 that includes low noise amplifier (LNA) 203, down-conversion transconductors 403A-403B, mixer 206, capacitors 209A-209B, and TIAs 303A-303B.

LNA 203 functions as described above in connection with FIG. 2. Transconductors 403A-403B precede mixer 206. Effectively, transconductors 403A-403B function as a second LNA, and provide more gain (compared to front end 300 of FIG. 3).

Mixer 206 functions as described above in connection with FIG. 2. Mixer 206 provides mixed I and Q signals to TIA 303A and TIA 303B, respectively. TIA 303A and TIA 303B provide low impedance to signals including and near the desired channel, allowing desired signals to pass through. However, they provide high impedance to signals away from the desired channel.

Capacitors 209A-209B provide low impedance to signals away from the desired channel and filter the mixed I and Q signals. Typically, capacitors 209A-209B have relatively large capacitance values. The large capacitance of capacitors 209A-209B attenuates the sum term (or the "2× term") from the output I and Q signals of mixer 206.

Figure 5:
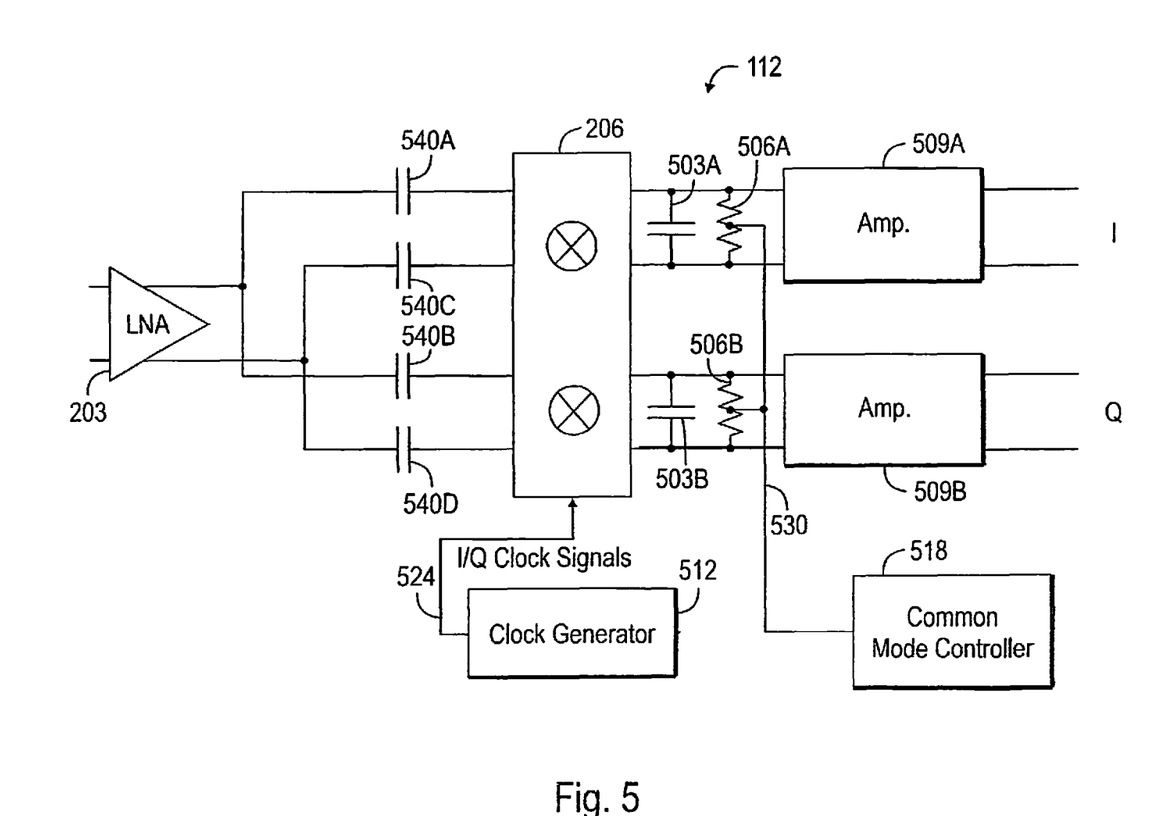
FIG. 5 illustrates a simplified block diagram of an RF front end circuitry according to an exemplary embodiment.

FIG. 5 illustrates a simplified block diagram of an RF front end circuit 112 according to an exemplary embodiment. Front end circuit 112 includes LNA 203, coupling capacitors 540A-540D, mixer 206, baseband capacitors 503A-503B, resistors 506A-506B, amplifiers 509A-509B, clock generator 512, and common mode controller 518.

LNA 203 receives and amplifies the received RF signals (shown as a differential signal in the embodiment of FIG. 5), and provides the amplified signals (shown as a differential signal in the embodiment of FIG. 5) to mixer 206. Because of its design, LNA 203 introduces relatively little noise into the received RF signals. It should be noted that, in other applications and/or configurations, if the input signal is sufficiently large, the LNA 203 may be replaced by a resistor.

Capacitors 540A-540D provide AC coupling of the output signal of LNA 203 to mixer 206. However, it should be understood that capacitors 540A-540D are optional. Mixer 206 mixes the amplified signals from LNA 203 with in-phase (I) and quadrature (Q) clock signals 524, provided by clock generator 512.

The I and Q clock signals 524 may have a duty cycle of 25% or about 25% (as opposed to conventional duty cycles of over 50% for improved I-Q isolation and improved IIP2).

Mixer 206 provides mixed I and Q signals to amplifiers 509A-509B. Amplifiers 509A-509B may generally constitute any amplifier with high input impedance.

Capacitors 503A-503B present high impedance to signals including and near the desired channel, and low impedance to signals far from the desired channel. Thus, capacitors 503A-503B provide filtering of the output signals of mixer 206. Capacitors 503A-503B may filter transmitter leakage, and improve the performance of the RF receiver that includes front end circuit 112.

In one embodiment, capacitors 503A-503B have relatively large capacitance values (for example, each of capacitors 503A-503B has a capacitance of 70 pF). In this scenario, capacitors 503A-503B provide out-of-band attenuation and improved out-of-band IIP2 (i.e., as caused by transmitter leakage into the receive path), as is appropriate for 3G transceivers. Furthermore, the relatively large capacitance values relax the filtering requirements of amplifiers 509A-509B as well as the wideband third order input intercept point (IIP3) requirements of baseband analog blocks.

In another embodiment, capacitors 503A-503B have relatively small capacitance values, or even zero capacitance values. In this situation, capacitors 503A-503B provide improved close-in IIP2, but relatively little out-of-band attenuation, as is appropriate for 2G/2.5G transceivers (IIP2 for close-in signals may be worse when the capacitance values are large or may require an extremely large values of capacitance for improved IIP2).

In yet another embodiment, capacitors 503A-503B have programmable capacitance values. For example, one may implement capacitors 503A-503B as a combination of differential capacitors (i.e., coupled between the inputs of amplifier 509A and/or amplifier 509B) and common-mode capacitors (i.e., capacitors coupled from an amplifier input to ground).

Controlled switches (controlled, for example, by logic) provide programmability of the effective capacitance and, thus, filtering, IIP2 improvement, etc. Thus, one may implement a programmable dual mode front end circuit with variable baseband capacitors to accommodate a variety of operating conditions or design specifications.

Note that, generally speaking, one should keep the effective series resistance of capacitors 503A-503B to a minimum.

The effective series resistance appears as a zero in the out-of-band attenuation transfer function. Thus, smaller effective series resistances result in improved out-of-band attenuation.

The overall operation and characteristics of front end circuit 112 may be controlled by logic. Such logic may be implemented by software, hardware and/or a combination of both. For example, various performance characteristics of front end circuit 112 (e.g., linearity (for example, IIP2), gain, noise figure (NF)) or trading off those performance characteristics may be programmable.

Logic controls the operation of clock generator 512 and common mode controller 518. More specifically, under appropriate logic control, clock generator 512 may generate the I/Q clock signals 524 with a desired duty cycle, frequency, etc. As previously noted, the desired duty cycle may be at or near 25%.

Logic also controls the operation of common mode controller 518. Common mode controller 518 controls or modifies common mode voltage or signal 530, which is applied to the centers or center nodes of resistors 506A-506B. In other words, the mid-point voltage of the resistors 506A and 506B is programmable by the common mode voltage or signal 530. Resistor 506A couples across the inputs of amplifier 509A. Similarly, resistor 506B couples across the inputs of amplifier 509B. By controlling the common mode voltage or signal 530 applied to resistors 506A-506B, common mode controller 518 can affect the switching characteristics (e.g., turn-on point) of the switches in mixer 206 (see FIG. 9).

Figure 6A:
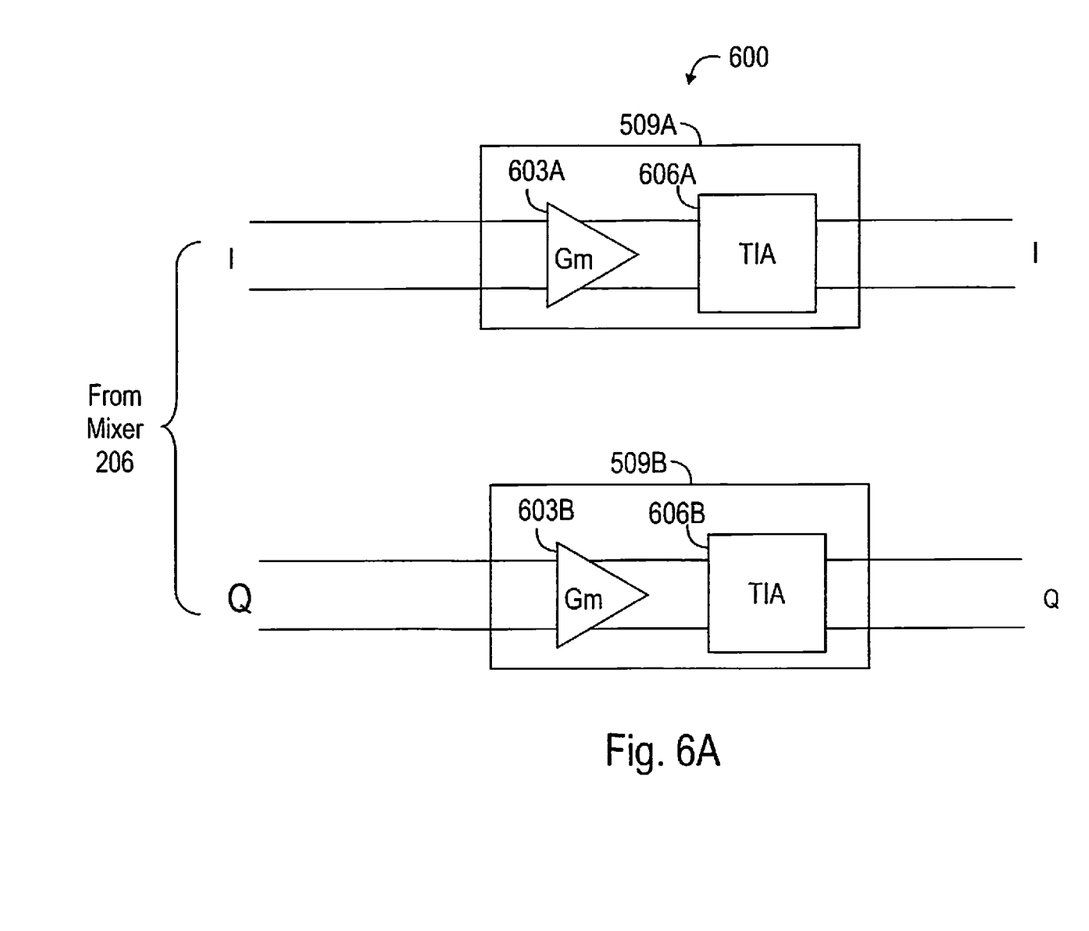
FIGS. 6A-6B depict simplified block diagrams of amplifiers used in front end circuitry according to exemplary embodiments.
Figure 6B:
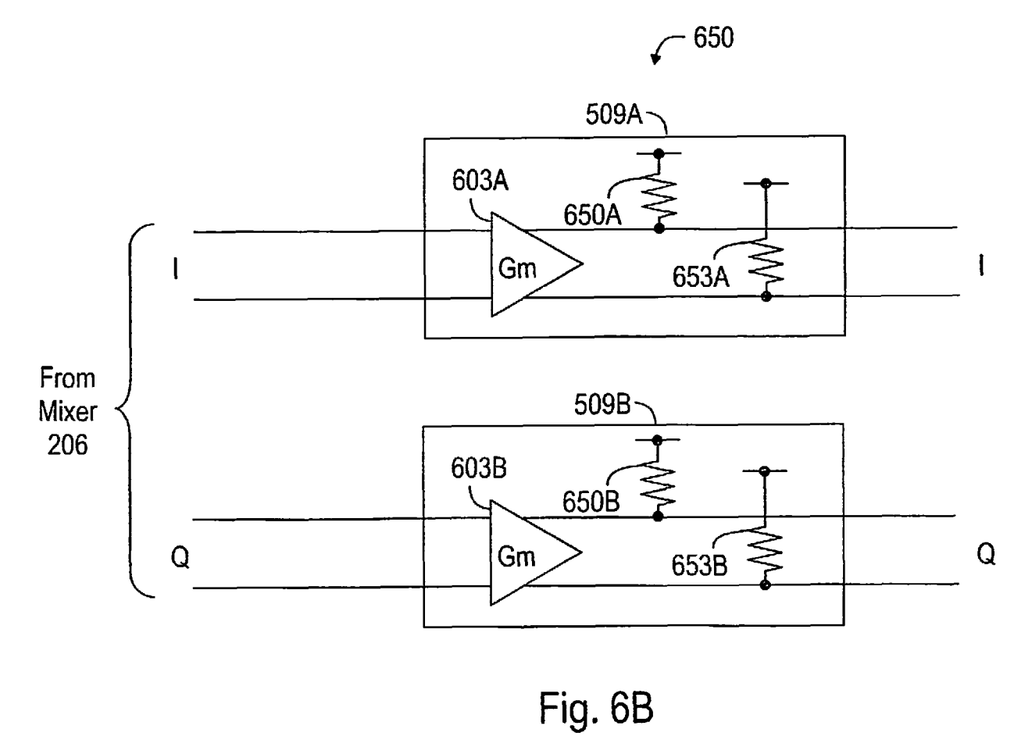

As noted above, amplifiers 509A-509B have high input impedances. One may implement amplifiers 509A-509B in a variety of ways, as persons of ordinary skill in the art who have the benefit of the description of the disclosed concepts understand. FIGS. 6A-6B depict simplified block diagrams of amplifiers used in front end circuitry according to exemplary embodiments.

FIG. 6A shows a circuit arrangement 600 for implementing amplifiers 509A-509B according to an exemplary embodiment. Amplifier 509A includes transconductor 603A and TIA 606A. Transconductor 603A receives the input signal of amplifier 509A (i.e., the I input signal). The output of transconductor 603A couples to, and drives the input of TIA 606A. The output of TIA 606A provides the output signal of amplifier 509A (i.e., the I output).

Similarly, amplifier 509B includes transconductor 603B and TIA 606B. Transconductor 603B receives the input signal of amplifier 509B (i.e., the Q input signal). The output of transconductor 603B couples to, and drives the input of TIA 606B. The output of TIA 606B provides the output signal of amplifier 509B (i.e., the Q output).

FIG. 6B shows a circuit arrangement 650 for implementing amplifiers 509A-509B according to another exemplary embodiment. Amplifier 509A includes transconductor 603A and load resistors 650A and 653A. Transconductor 603A receives the input signal of amplifier 509A (i.e., the I input signal). The output of transconductor 603A provides the output signal of amplifier 509A (i.e., the I output). Resistors 650A and 653A constitute load resistors for the output stage of transconductor 603A.

Likewise, amplifier 509B includes transconductor 603B and load resistors 650B and 653B. Transconductor 603B receives the input signal of amplifier 509B (i.e., the Q input signal). The output of transconductor 603B provides the output signal of amplifier 509B (i.e., the Q output). Resistors 650B and 653B constitute load resistors for the output stage of transconductor 603B.

In both circuit arrangements in FIGS. 6A-6B, transconductors 603A-603B are biased with a common mode biasing signal or voltage, $V_{Gm\text{-}CM}$ (not shown explicitly in FIGS. 5, 6A, and 6B). Generally speaking, the biasing voltage or signal $V_{Gm\text{-}CM}$ is programmable by appropriate logic. By programming the level of the biasing voltage or signal $V_{Gm\text{-}CM}$, the logic may program the switching points of the switches of mixer 206 and, as a result, the performance characteristics of front end circuits according to various embodiments.

Figure 7:
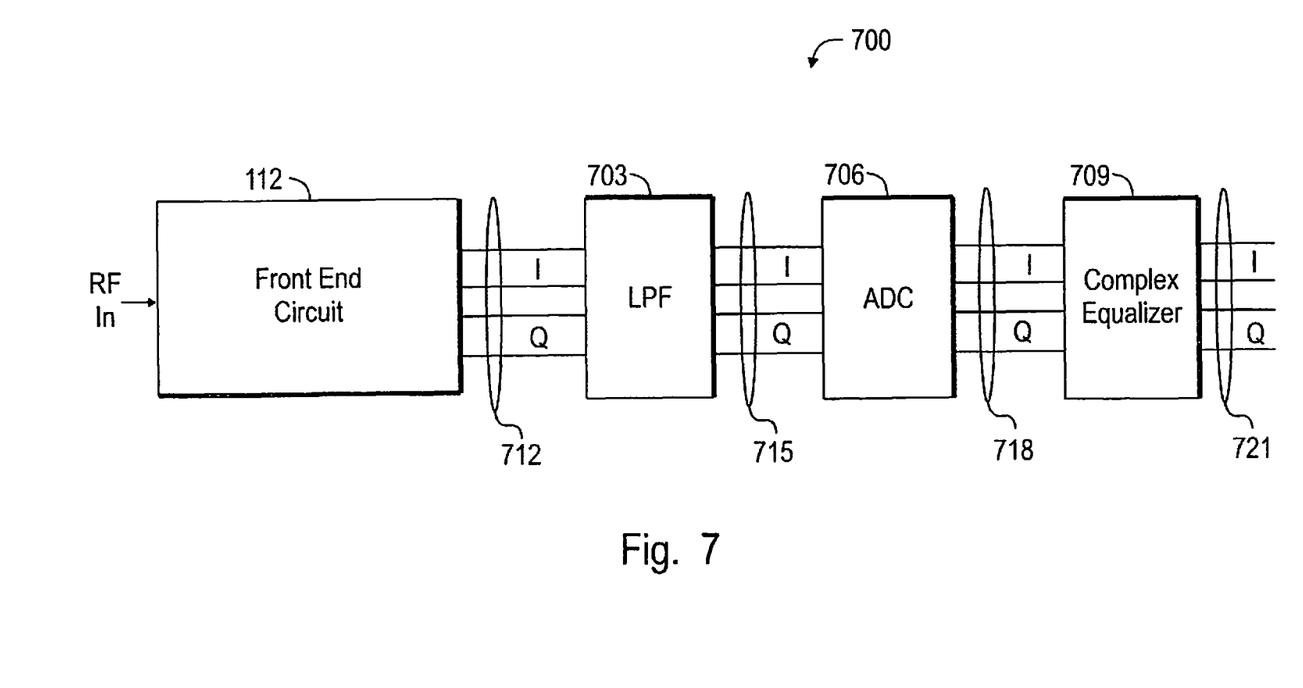
FIG. 7 illustrates a simplified block diagram of receive path circuitry 700 according to an exemplary embodiment.

FIG. 7 illustrates a simplified block diagram of receive path circuitry 700 according to an exemplary embodiment. Receive path circuitry 700 includes front end circuit 112, low pass filter (LPF) 703, analog-to-digital converter (ADC) 706, and complex equalizer 709.

Receive path circuitry 700 may constitute the circuit arrangement shown in FIG. 5 or other embodiments according to the disclosed concepts, as desired. The I/Q outputs 712 of front end circuit 112 drive the input of LPF 703.

LPF 703 performs low pass filtering of the output signals of front end circuit 112 to generate filtered I/Q signals 715. Put another way, LPF 703 provides Nyquist filtering of the output signals of front end circuit 112 before the analog-to-digital conversion process in order to avoid aliasing. LPF 703 also provides filtering of blockers (blockers may be further filtered using digital filtering, as desired).

ADC 706 accepts the analog filtered I/Q signals 715, and converts those signals to digital signals. Thus, ADC 706 provides at its outputs digital I/Q signals 718.

Complex equalizer 709 performs complex equalization of digital I/Q signals 718 to generate equalized I/Q signals 721. Generally speaking, complex equalizer 709 equalizes digital I/Q signals 718 to correct an in-band droop that occurs because of parasitic capacitance on the output of the LNA (e.g., LNA 203 in FIG. 5).

More specifically, parasitic capacitance on the RF side of the mixer, i.e., at the LNA output, results in the peak response moving lower in frequency (i.e., a shift in frequency to the left), and thus a complex in-band droop. Large baseband capacitor values can result in a more significant droop across the band.

The droop can vary with process (e.g., the fabrication process for an integrated circuit that includes a transceiver according to the disclosed concepts). The droop is particularly dependent upon the capacitance and resistance at the output of LNA 203.

One may, however, equalize the droop in the digital domain by using complex equalizer 709 to obtain a flat (or relatively or substantially flat) response in the band of interest. Complex equalizer 709 equalizes the asymmetry (because of the droop) of the response for positive and negative frequencies, and thus provides a flat (or relatively or substantially flat) response.

Complex equalizer 709 may have a variety of responses or frequency transfer functions. In one embodiment, complex equalizer 709 may have a fixed response. In another embodiment, complex equalizer 709 may have a programmable response. In yet another embodiment, complex equalizer 709 may have an adaptive response.

Note that one may take steps to minimize the raw droop (i.e., unequalized droop), as desired. For example, one may reduce the capacitance of the baseband capacitors, or use programmable capacitors, described above. As another example, one may perform circuit calibration, such as resistor-capacitor (RC) calibration. As yet another example, one may reduce the capacitance of the baseband capacitors (or use programmable capacitors) and also perform circuit calibration (e.g., RC calibration).

As noted above, one may implement front end circuits according to the disclosed concepts whose linearity and noise performance can be optimized for different design objectives.

To do so, one may use biasing techniques described below, including biasing of the well of the switching devices, and signal swing of the switching devices in the mixer. In this manner, one may trade off performance measures such as linearity (e.g., IIP2), gain, and noise figure (NF).

Figure 8:
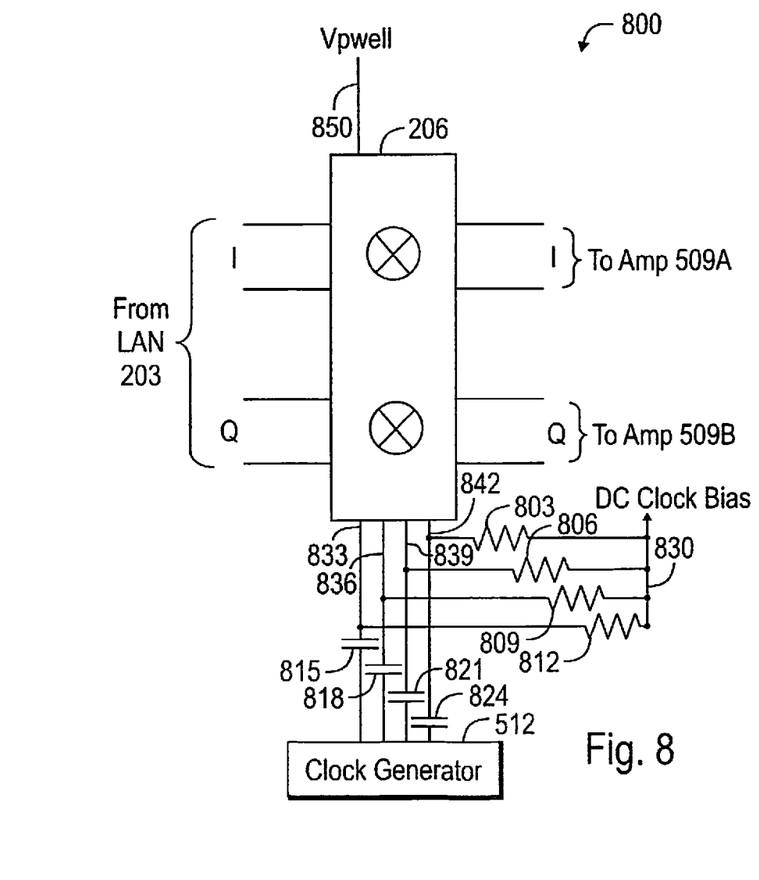
FIG. 8 shows a circuit arrangement for a biasing scheme for a front end circuitry according to an exemplary embodiment.

FIG. 8 shows a circuit arrangement 800 for a biasing scheme for a front end circuitry according to an exemplary embodiment. Circuit arrangement 800 includes mixer 206, clock generator 512, resistors 803, 806, 809, and 812, and capacitors 815, 818, 821, and 824. Mixer 206 and clock generator 512 operate as described above, for example, in connection with FIG. 5.

Capacitors 815, 818, 821, and 824 couple the output signals of clock generator 512 (e.g., I/Q clock signals 524 in FIG. 5) to mixer 206. In other words, capacitors 815, 818, 821, and 824 provide AC coupling between the outputs of clock generator 512 and the local oscillator (LO) inputs of mixer 206. Note that, in addition, one may couple LNA 203 to mixer 206 via AC coupling capacitors (not shown in FIG. 8), as desired.

Resistors 803, 806, 809, and 812 provide DC bias to the LO inputs of mixer 206. Specifically, resistor 803 couples input 842 of mixer 206 to DC clock bias voltage (generally, DC clock bias signal) 830, whereas resistor 806 couples input 839 of mixer 206 to DC clock bias voltage 830.

Similarly, resistor 809 couples input 836 of mixer 206 to DC clock bias voltage 830, whereas resistor 812 couples input 833 of mixer 206 to DC clock bias voltage 830.

Generally speaking, DC clock bias voltage or signal 830 is programmable by appropriate logic. The DC clock bias voltage or signal 830 may be programmed to track or otherwise move in response to the common mode voltage or signal 530. By programming the level of DC clock bias voltage or signal 830, the logic may program the attributes (e.g., swing, or clock signal low and high levels) of the input clock (LO) signals to mixer 206 and, as a result, the performance characteristics of front end circuits according to various embodiments. For example, the DC voltage around which the switches of the mixer 206 are switching may be adjusted for desired performance.

The devices (e.g., n-channel transistors) of mixer 206 may reside in a p-well (in a complementary metal oxide semiconductor, or CMOS, fabrication process). The p-well has a biasing signal or voltage (Vp-well) 850. Generally speaking, well biasing signal or voltage (Vp-well) 850 is programmable by appropriate logic. By programming the level of well biasing signal or voltage (Vp-well) 850, the logic may program the attributes (e.g., turn-on point, etc.) of the switches of mixer 206 and, as a result, the performance characteristics of front end circuits according to various embodiments.

One may use common mode controller 518 to program desired levels or desired trade-off among the performance characteristics of front end circuits according to various embodiments. The clock waveforms supplied to mixer 206 by clock generator 512 overlap for a finite amount of time at the point when the clock signals cross over. By using common mode controller 518 to bias the common mode voltage or signal 530, one can control or program whether the corresponding mixer switches (see FIG. 9 and accompanying description) are ON or OFF during the clock overlap period. More specifically, if the switches are ON at the same time, one loses gain, but gains linearity. Conversely, if the switches are OFF at the same time, the gain increases, but linearity decreases.

As described above, in exemplary embodiments, several bias voltages or signals (e.g., biasing signal or voltage, $V_{Gm\text{-}CM}$, for transconductors 603A-603B, DC clock bias voltage or signal 830, and well biasing signal or voltage (Vp-well)) are programmable. By programming the relationship between those bias signals or voltages (e.g., the relative values of two or more of the signals or voltages with respect to one another, or the absolute values of one or more of the signals or voltages), one may program desired levels or desired trade-off among the performance characteristics of front end circuits according to various embodiments, such as linearity (e.g., IIP2), gain, and NF.

Logic may be used to program front-end circuitry 112 on the fly for optimization for different communication standards or protocols. However, design of high performance transceivers or receivers will often trade noise performance with linearity. Noise and linearity are relatively difficult to simulate, and fine tuning of the trade-offs between noise and linearity are often performed after evaluation of fabricated circuits. Logic may also be used to evaluate a design, and provide optimization during the engineering characterization phase. Logic may also be used to optimize a design as a function of process corner, operating temperature, and the like.

As noted, in exemplary embodiments, mixer 206 uses clock signals (e.g., signals 833, 836, 839, and 842 in FIG. 8) with 25% (or about 25%) duty cycle. That level or range of duty cycle provides improved linearity, specifically, better IIP2, compared to the 50% duty cycle clocks used conventionally, and also allows sharing LNA 203.

Figure 9:
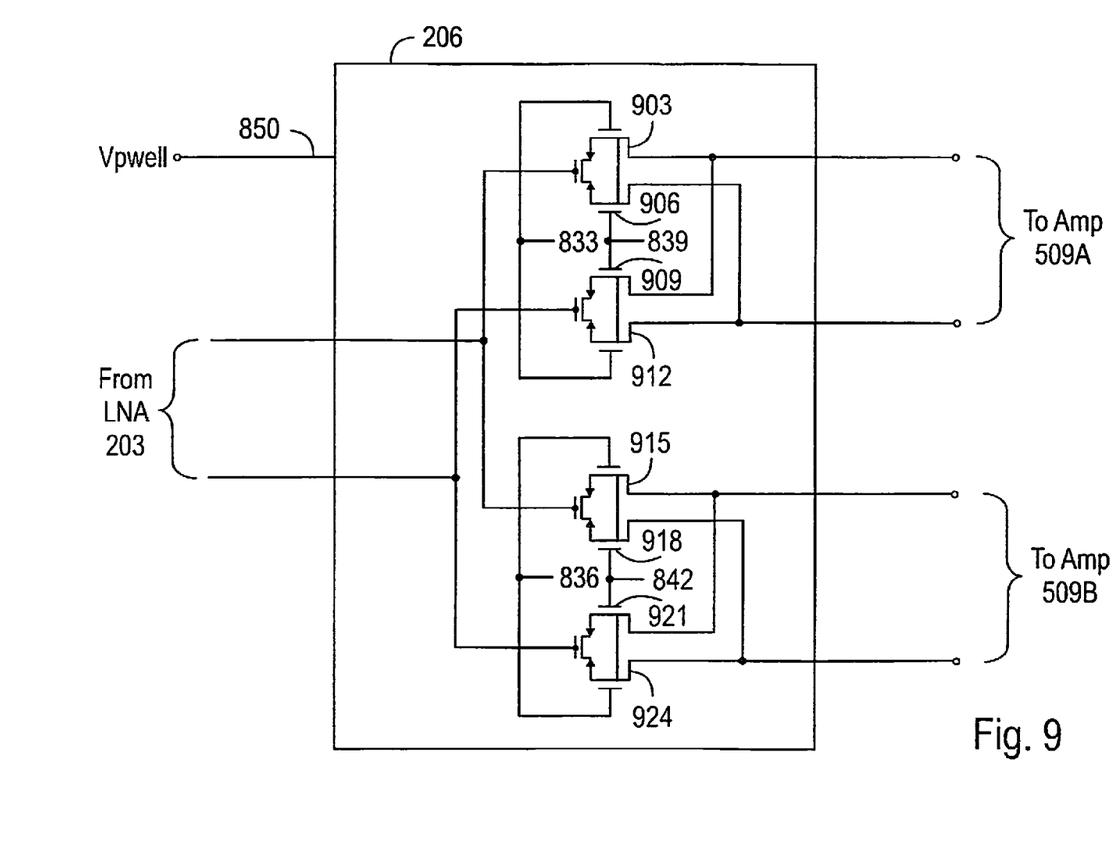
FIG. 9 depicts a passive mixer for use in front end circuitry according to various exemplary embodiments.

Various embodiments according to the disclosed concepts may use a variety of mixers, for example, passive mixers. FIG. 9 depicts a passive mixer for use in front end circuitry according to various exemplary embodiments.

Referring to FIG. 9, mixer 206 includes n-type (or n-channel) transistors 903, 906, 909, 912, 915, 918, 921, and 924. Transistors 903, 906, 909, 912, 915, 918, 921, and 924 reside in a p-well. The p-well has a biasing signal or voltage (Vp-well) 850.

The output differential signal of LNA 203 drives the source terminals of the transistors. Specifically, the positive output signal of LNA 203 drives the source terminal of transistors 903, 906, 915, and 918. Conversely, the negative output signal of LNA 203 drives the source terminal of transistors 909, 912, 921, and 924.

Clock signal 833 (see FIG. 8) couples to the gate terminals of transistors 903 and 912, whereas clock signal 839 (see FIG. 8) couples to the gate terminals of transistors 906 and 909. Similarly, clock signal 836 (see FIG. 8) couples to the gate terminals of transistors 915 and 924, whereas clock signal 842 (see FIG. 8) couples to the gate terminals of transistors 918 and 921.

The drain terminals of transistors 903 and 909 couple together to provide the positive I output signal of mixer 206, whereas the drain terminals of transistors 906 and 912 couple together to provide the negative I output signal.

Similarly, the drain terminals of transistors 915 and 921 couple together to provide the positive Q output signal of mixer 206, whereas the drain terminals of transistors 918 and 924 couple together to provide the negative Q output signal.

Although the embodiment in FIG. 9 uses n-channel transistors, one may use p-channel transistors, as persons of ordinary skill in the art who have the benefit of the description of the disclosed concepts understand. In that case, the transistors would reside in an n-well that couples to an appropriate well biasing signal or voltage.

Figure 10:
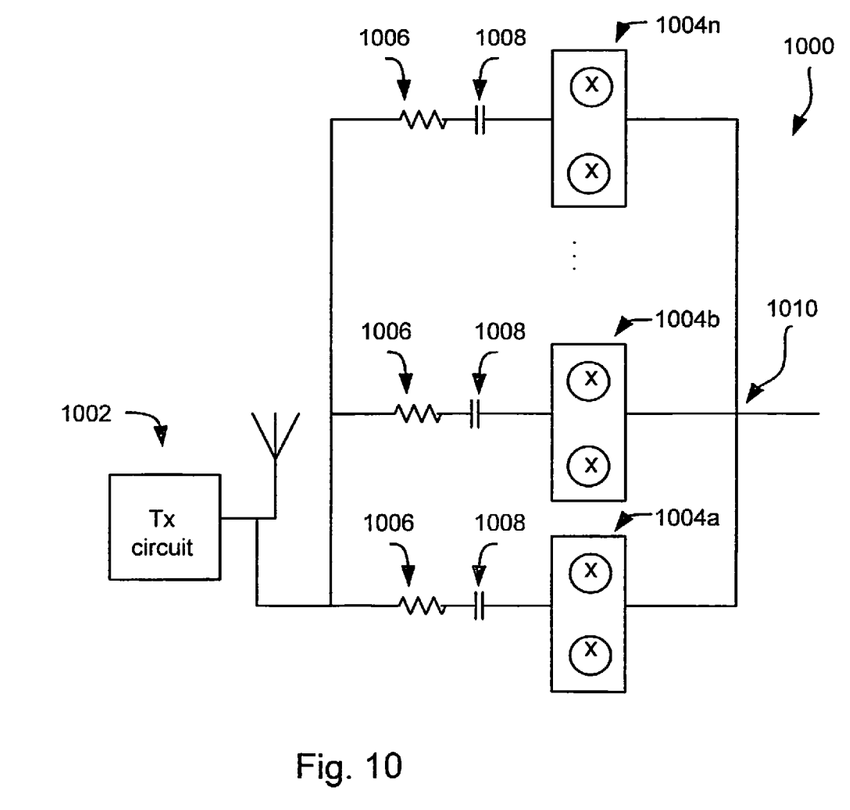
FIG. 10 shows a circuit arrangement for use in demodulating a transmit signal according to an exemplary embodiment.

The disclosed concepts may also be applied to demodulation of a transmit signal in a feedback configuration. As shown in FIG. 10, the circuit arrangement 1000 includes a transmit circuit 1002 and a number of mixers 1004a-n. The transmit circuit 1002 is coupled to the mixers 1004a-n via corresponding resistors 1006. It should be noted that the coupling between the transmit circuit 1002 and the mixers 1004a-n may be implemented via differential connections. Optionally, corresponding capacitors 1008 may be disposed between the mixers 1004a-n and the resistors 1006.

Figure 11:
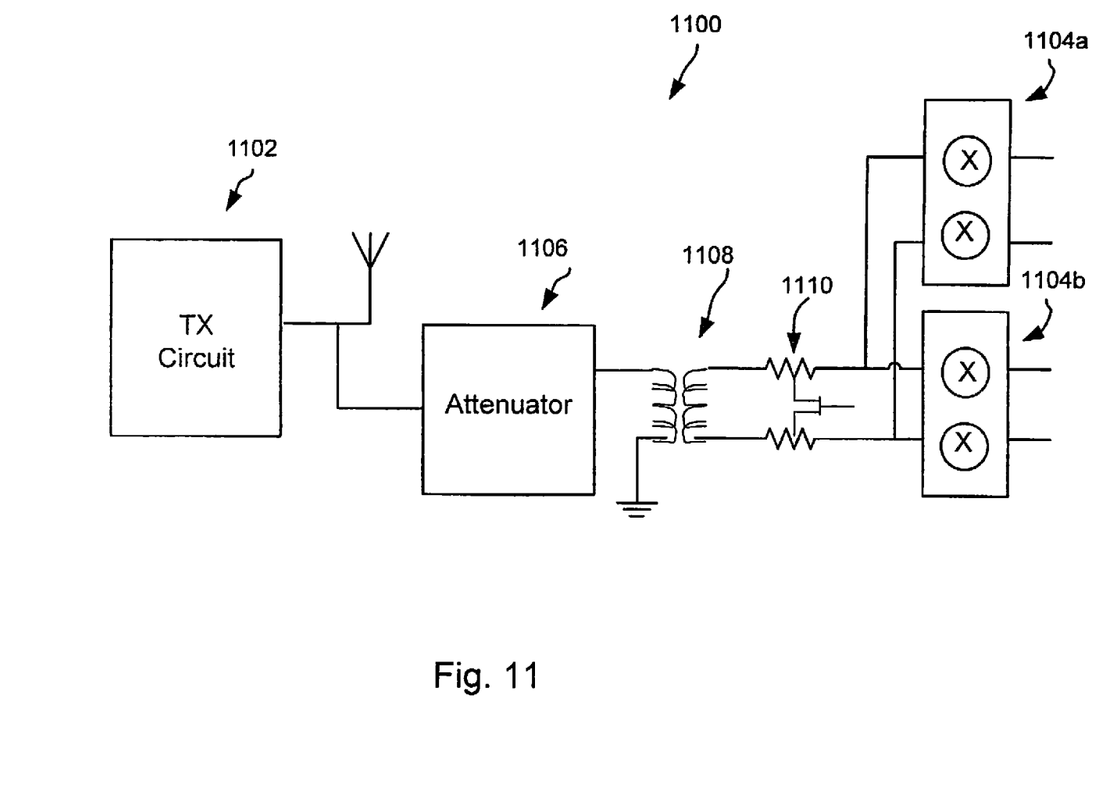
FIG. 11 shows another circuit arrangement for use in demodulating a transmit signal according to an exemplary embodiment.

Alternatively, as shown in FIG. 11, another circuit arrangement 1100 may be used in demodulation of a transmit signal in a feedback configuration. The circuit arrangement 1100 includes a transmit circuit 1102 and a number of mixers 1104a-b. The transmit circuit 1102 is coupled to the mixers 1104a-b via a first attenuator 1106, a balun 1108 and a second attenuator 1110. The first attenuator 1106 may be external. The balun 1108 may be on-chip. The second attenuator 1110 may be variable and on-chip and may include a number of resistors (e.g., 4 resistors) and a shunt switch.

Each of the mixers 1004a-n may have a structure similar to that shown in FIGS. 8 and 9. Furthermore, the mixers 1004a-n may each be binary-weighted such that the current at node 1010 may be varied. In other words, the mixers 1004a-n may be switched on and off selectively to provide a varying current at node 1010. The current at node 1010 may then be provided in a feedback loop to a transmit path. The transmit path may include the transmit circuit 1002.

As persons of ordinary skill in the art who have the benefit of the description of the disclosed concepts understand, one may apply the disclosed concepts effectively to various RF apparatus, as desired. Examples described in this document constitute merely illustrative applications, and are not intended to limit the application of the disclosed concepts to other apparatus, architectures, or designs.

For example, FIG. 1 shows an RF transceiver 100 that uses front end circuit 112 according to the disclosed concepts. Rather than in a transceiver, however, one may apply the disclosed concepts (e.g., front end circuit, complex equalization, receive path circuitry) to other types of circuit, for example, an RF receiver (e.g., global positioning satellite (GPS) receiver), by making appropriate modifications that fall within the knowledge and level of skill of persons of ordinary skill in the art who have the benefit of the description of the disclosed concepts.

As another example, one may apply the disclosed concepts (e.g., front end circuit, complex equalization, receive path circuitry) to RF receivers or transceivers that employ direct conversion. As yet another example, one may apply the disclosed concepts (e.g., front end circuit, complex equalization, receive path circuitry) to RF receivers or transceivers that use low intermediate frequency (low IF) conversion by making appropriate modifications that fall within the knowledge and level of skill of persons of ordinary skill in the art who have the benefit of the description of the disclosed concepts.

In turn, the disclosed concepts as embodied in RF receivers or transceivers may further be implemented in various types of devices that are capable of providing wireless communications, such as, cellular phones, mobile phones, personal digital assistants, laptop computers, and other devices that fall within the knowledge and level of skill of persons of ordinary skill in the art who have the benefit of the description provided herein.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of this disclosure understand. Other modifications and alternative embodiments in addition to those described here will be apparent to persons of ordinary skill in the art who have the benefit of this disclosure. Accordingly, this description teaches those skilled in the art the manner of carrying out the disclosed concepts and are to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art who have the benefit of this disclosure may use certain features of the disclosed concepts independently of the use of other features, without departing from the scope of the disclosed concepts.

What is claimed is:

1. A receiver comprising:
a mixer including a plurality of switches;
a clock generator configured to generate clock signals to drive the plurality of switches of the mixer;
a plurality of capacitances to couple the clock signals to respective inputs of the plurality of switches;
a plurality of resistances coupled to the respective inputs of the plurality of switches; and
a logic configured to output a first signal to the plurality of resistances,
wherein the first signal determines one or more attributes of the clock signals, and
wherein one or more switching characteristics of the plurality of switches of the mixer are based on the one or more attributes of the clock signals.

2. The receiver of claim 1, wherein:
the plurality of switches is arranged in a well on a semiconductor substrate,
the logic is configured to output a second signal to bias the well, and
the one or more switching characteristics of the plurality of switches of the mixer are based on a biasing of the well by the second signal.

3. The receiver of claim 2, wherein the logic is configured to program a relationship between the first signal and the second signal to control one or more of (i) a linearity, (ii) a gain, and (iii) a noise figure of the receiver.

4. The receiver of claim 1, wherein the mixer is configured to generate (i) a first output and (ii) a second output, the receiver further comprising:
a first filter configured to filter the first output;
a second filter configured to filter the second output; and
a controller configured to output a control signal to (i) the first filter, and (ii) the second filter, and
wherein the one or more switching characteristics of the plurality of switches of the mixer are based on the control signal output to (i) the first filter, and (ii) the second filter.

5. The receiver of claim 4, wherein the first filter and the second filter each includes:
a capacitance; and
a resistance connected in parallel to the capacitance.

6. The receiver of claim 5, wherein:
the controller is configured to program the capacitance to a first capacitance value in response to the receiver operating in a first mode, and
the controller is configured to program the capacitance to a second capacitance value in response to the receiver operating in a second mode.

7. The receiver of claim 6, wherein:
the first capacitance value determines one or more of (i) linearity, (ii) gain, and (iii) noise figure of the receiver in the first mode; and
the second capacitance value determines one or more of (i) linearity, (ii) gain, and (iii) noise figure of the receiver in the second mode.

8. The receiver of claim 4, further comprising:
a first amplifier coupled to the first filter; and
a second amplifier coupled to the second filter,
wherein the control signal biases the first amplifier and the second amplifier.

9. The receiver of claim 8, wherein the controller is configured to program a relationship between the first signal and the control signal to control one or more of (i) a linearity, (ii) a gain, and (iii) a noise figure of the receiver.

10. The receiver of claim 8, wherein the first amplifier and the second amplifier each comprises a transconductance amplifier coupled to a transimpedance amplifier.

11. The receiver of claim 8, wherein the first amplifier and the second amplifier each comprises a transconductance amplifier with outputs connected to resistances.

12. A system comprising:
a plurality of mixers, wherein each of the plurality of mixers includes a plurality of switches;
a clock generator configured to generate clock signals to drive the plurality of switches;
a plurality of capacitances to couple the clock signals to respective inputs of the plurality of switches;
a plurality of resistances coupled to the respective inputs of the plurality of switches; and
a logic configured to output a first signal to the plurality of resistances,
wherein the first signal determines one or more attributes of the clock signals, and
wherein one or more switching characteristics of the plurality of switches are based on the one or more attributes of the clock signals.

13. The system of claim 12, wherein:
the plurality of switches is arranged in a well on a semiconductor substrate,
the logic is configured to output a second signal to bias the well, and
the one or more switching characteristics of the plurality of switches of the mixer are based on a biasing of the well by the second signal.

14. The system of claim 12, further comprising a transmit circuit including an output coupled to an input of each of the plurality of mixers via one or more of (i) a resistance, and (ii) a capacitance.

15. The system of claim 12, further comprising:
a transmit circuit;
a first attenuator coupled to the transmit circuit;
a balun coupled to the first attenuator; and
a second attenuator coupled to (i) the balun and (ii) an input of each of the plurality of mixers.

16. The system of claim 15, wherein the second attenuator comprises (i) two or mode resistances, and (ii) a shunt switch.

17. The system of claim 15, wherein the second attenuator is coupled to the input of each of the plurality of mixers at a node, and wherein current at the node varies in accordance with a number of the plurality of mixers turned on.

18. The system of claim 15, wherein the second attenuator is coupled to the input of each of the plurality of mixers at a node, and wherein current at the node is supplied to the transmit circuit.

19. The receiver of claim 1, wherein:
the one or more attributes of the clock signals include swing, or low and high levels of the clock signals; and
the one or more switching characteristics of the plurality of switches of the mixer include turn on point of the plurality of switches.

20. The system of claim 12, wherein:
the one or more attributes of the clock signals include swing, or low and high levels of the clock signals; and
the one or more switching characteristics of the plurality of switches of the mixer include turn on point of the plurality of switches.

* * * * *